US009723068B2

(12) United States Patent
Alonzo et al.

(10) Patent No.: US 9,723,068 B2
(45) Date of Patent: *Aug. 1, 2017

(54) INTER-PLATFORM MANAGEMENT OF COMPUTING RESOURCES

(71) Applicant: International Business Machines Corporation, Armonk, NY (US)

(72) Inventors: Victor G. Alonzo, Wappingers Falls, NY (US); Yuk L. Chan, Rochester, NY (US); Gisela C. Cheng, Rhinebeck, NY (US); Kin Ng, Wappingers Falls, NY (US); Vaughn C. Page, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,114

(22) Filed: Sep. 20, 2016

(65) Prior Publication Data

US 2017/0111439 A1 Apr. 20, 2017

Related U.S. Application Data

(63) Continuation of application No. 14/884,865, filed on Oct. 16, 2015, now Pat. No. 9,558,004.

(51) Int. Cl.
*G06F 9/455* (2006.01)
*H04L 29/08* (2006.01)
(Continued)

(52) U.S. Cl.
CPC .......... *H04L 67/10* (2013.01); *H04L 41/5006* (2013.01); *H04L 47/70* (2013.01); *H04L 67/42* (2013.01)

(58) Field of Classification Search
None
See application file for complete search history.

(56) References Cited

U.S. PATENT DOCUMENTS 7,607,129 B2 10/2009 Rosu et al.
8,572,612 B2 10/2013 Kern
(Continued)

OTHER PUBLICATIONS

Alonzo et al., "Inter-Platform Management of Computing Resources", U.S. Appl. No. 15/270,052, filed Sep. 20, 2016, 47 pages.

(Continued)

*Primary Examiner* — Sisley Kim
(74) *Attorney, Agent, or Firm* — Steven L. Fisher-Stawinski

(57) ABSTRACT

A computer-implemented method includes identifying a primary computing platform, identifying one or more secondary computing platforms, and identifying a requesting virtual server. The requesting virtual server resides on the primary computing platform and is associated with one or more requesting clients. One or more donating virtual servers are identified. The donating virtual servers reside on the primary computing platform and are associated with one or more donating clients. One or more external virtual servers are identified. The external virtual servers reside on the secondary computing platforms. A resource donation scenario is determined. The resource donation scenario includes one or more resource exchanges between the requesting virtual server and the donating virtual servers. A resource adjustment scenario is determined. The resource adjustment scenario includes one or more resource exchanges between the external virtual servers. A corresponding computer program product and computer system are also disclosed.

3 Claims, 6 Drawing Sheets

(51) Int. Cl.
*H04L 12/911* (2013.01)
*H04L 12/24* (2006.01)
*H04L 29/06* (2006.01)

(56) References Cited

U.S. PATENT DOCUMENTS

| | | | |
|---|---|---|---|
| 2005/0055590 | A1 | 3/2005 | Farkas et al. |
| 2008/0215846 | A1* | 9/2008 | Aman .................. G06F 9/5077 711/173 |
| 2010/0268816 | A1* | 10/2010 | Tarui ....................... H04L 12/00 709/224 |
| 2011/0185064 | A1 | 7/2011 | Head et al. |
| 2012/0023492 | A1 | 1/2012 | Govindan et al. |
| 2012/0136989 | A1 | 5/2012 | Ferris et al. |
| 2013/0326507 | A1 | 12/2013 | McGrath et al. |
| 2014/0298332 | A1 | 10/2014 | Cai et al. |

OTHER PUBLICATIONS

Alonzo et al., "Inter-Platform Management of Computing Resources", U.S. Appl. No. 15/270,169, filed Sep. 20, 2016, 47 pages.

IBM, "List of IBM Patents or Patent Applications Treated as Related", Appendix P, dated Sep. 23, 2016, 2 pages.

Alonzo et al., "Inter-Platform Management of Computing Resources", U.S. Appl. No. 14/884,865, filed Oct. 16, 2015, 50 pages.

Mell et al., "The NIST Definition of Cloud Computing", Recommendations of the National Institute of Standards and Technology, Special Publication 800-145, Computer Security Division, Information Technology Laboratory, National Institute of Standards and Technology, Gaithersburg, MD 20899-8930, Sep. 2011, 7 pages.

Paul, C. J., "IBM SmartCloud Control Desk—Overview of new features in version 7.5.1", IBM, Announced Feb. 12, 2013— Generally available Feb. 15, 2013, 39 pages, © 2013 IBM Corporation.

Wood et al., "Profiling and Modeling Resource Usage of Virtualized Applications", Middleware 2008, LNCS 5346, pp. 366-387, © IFIP International Federation for Information Processing 2008, <http://seelab.ucsd.edu/virtualefficiency/related_paperstwood-middleware08.pdf>.

IBM, "Virtual Machine Balancing and Resource Management", An IP.com Prior Art Database Technical Disclosure, Original Publication Date: Oct. 11, 2005, IP.com No. IPCOM000130015D, IP.com Electronic Publication: Oct. 11, 2005, 8 pages, <http://null/IPCOM/000130015>.

* cited by examiner

INTER-PLATFORM MANAGEMENT OF COMPUTING RESOURCES

BACKGROUND

The present invention relates generally to multi-platform and multi-tenant computing environments and more particularly to resource management in those environments.

In multi-platform and multi-tenant computing environments, resource management is important to efficient use of the computing resources provided by those environments. Developers and users of multi-platform and multi-tenant computing environments continue to incur costs arising out of managing resources associated with multiple clients and residing on multiple computing platforms.

SUMMARY

A computer-implemented method includes identifying a primary computing platform, identifying one or more secondary computing platforms, and identifying a requesting virtual server. The requesting virtual server resides on the primary computing platform and is associated with one or more requesting clients. The computer-implemented method further includes identifying one or more donating virtual servers. The one or more donating virtual servers reside on the primary computing platform and are associated with one or more donating clients. The computer-implemented method further includes identifying one or more external virtual servers. The one or more external virtual servers reside on the one or more secondary computing platforms. The computer-implemented method further includes determining a resource donation scenario. The resource donation scenario includes one or more resource exchanges between the requesting virtual server and the one or more donating virtual servers. The computer-implemented method further includes determining a resource adjustment scenario. The resource adjustment scenario includes one or more resource exchanges between the one or more external virtual servers. A corresponding computer program product and computer system are also disclosed.

DETAILED DESCRIPTION

Figure 1:
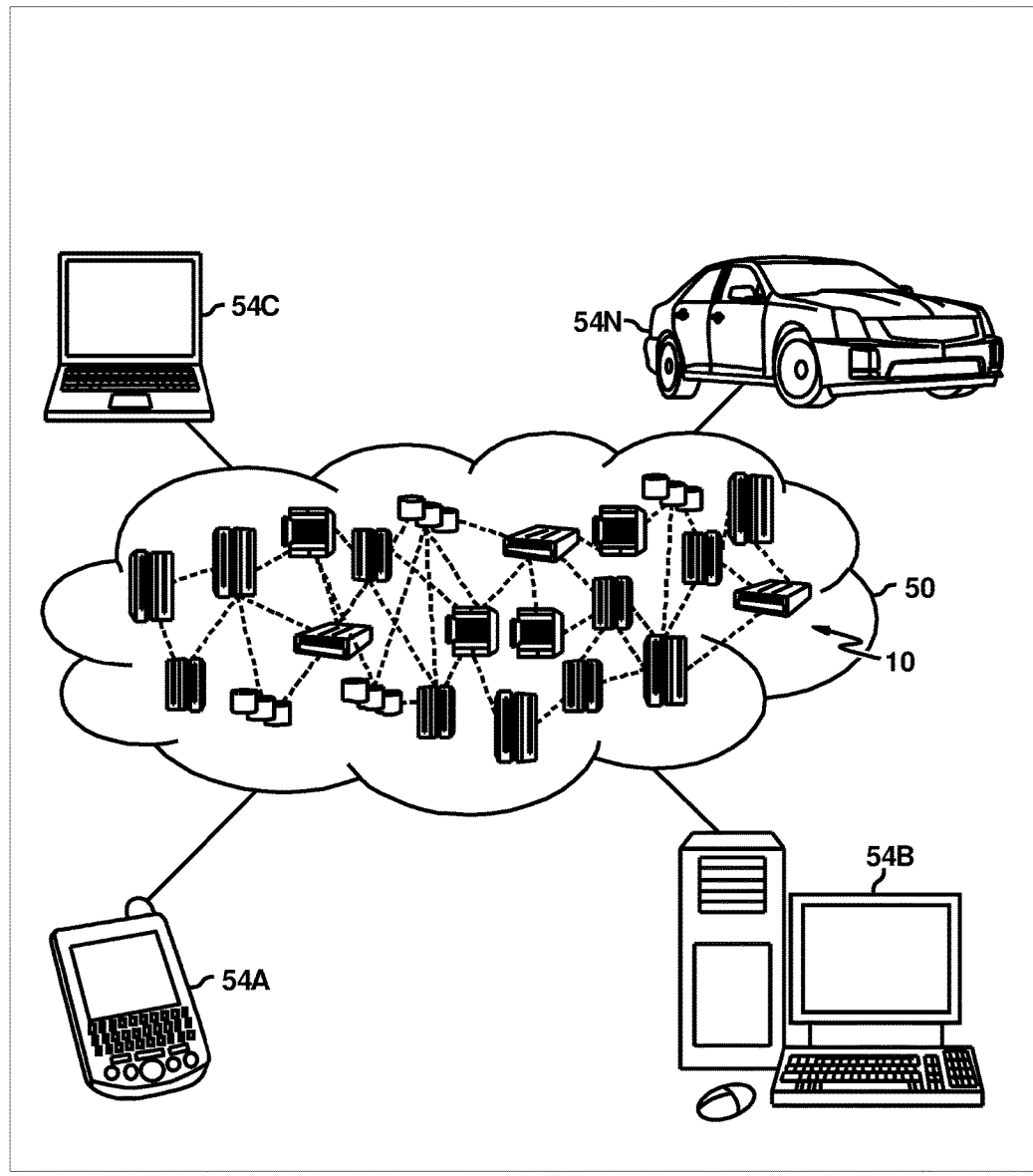
FIG. 1 depicts a cloud computing environment, in accordance with at least one embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
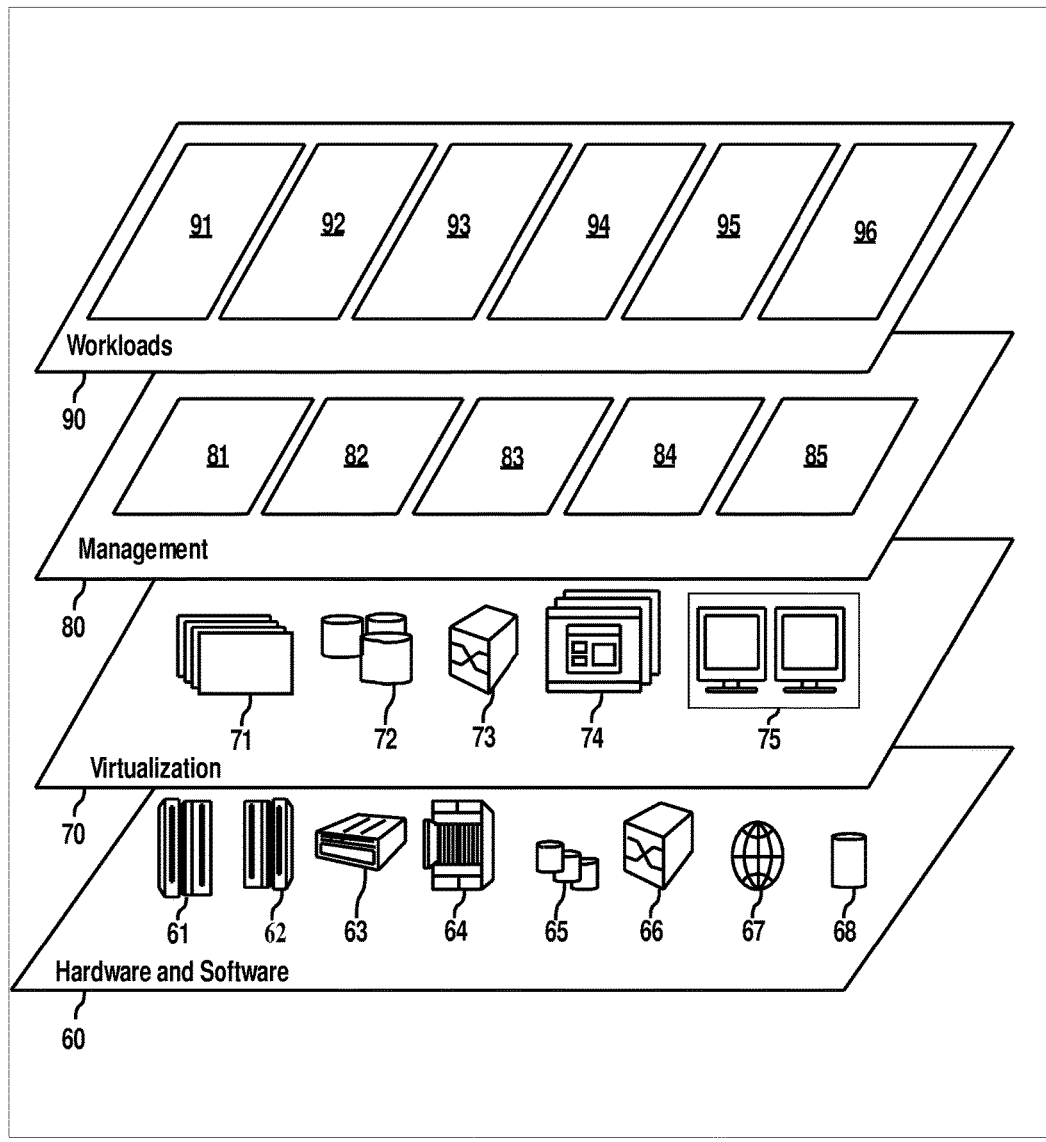
FIG. 2 depicts abstraction model layers, in accordance with at least one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual transfer of computing resources 96.

Figure 3:
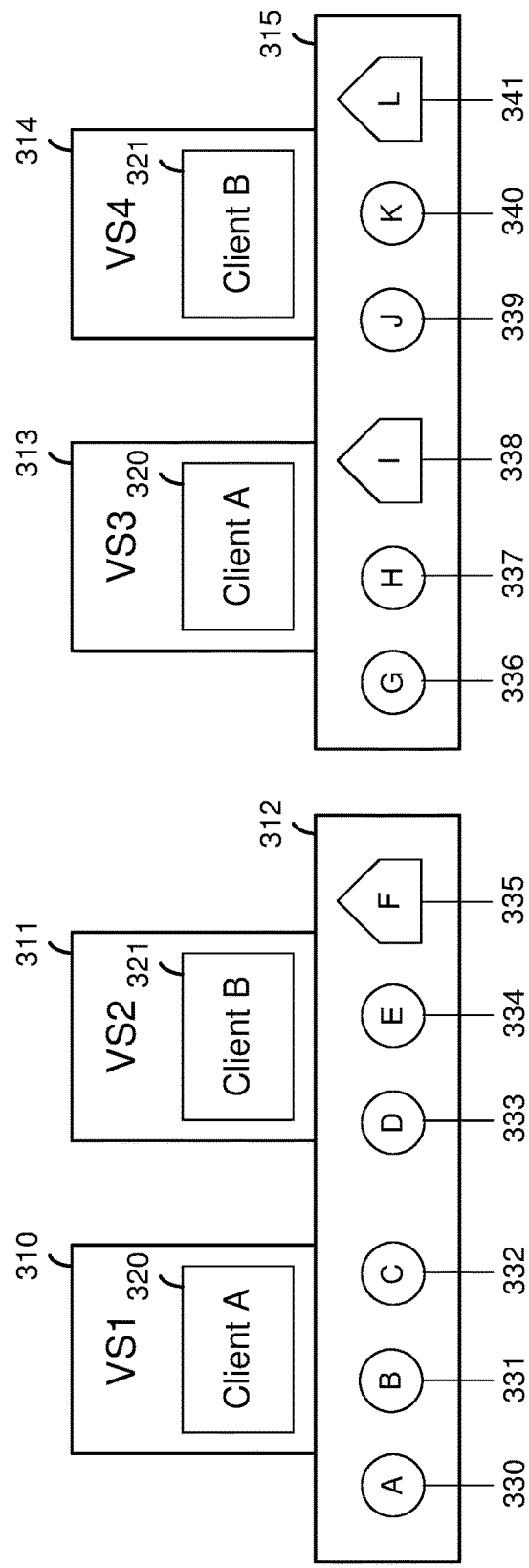
FIG. 3 is a block diagram of one embodiment of a computing environment suitable for operation of a virtual resource transfer program, in accordance with at least one embodiment of the present invention.

FIG. 3 is a block diagram of one embodiment of a computing environment suitable for operation of a virtual resource transfer program, in accordance with at least one embodiment of the present invention. In the computing environment depicted in FIG. 3, virtual server VS1 310 and virtual server VS2 311 reside on a primary computing platform 312, while virtual server V3 313 and virtual server VS4 314 reside on a secondary computing platform 315. VS1 310 and VS3 313 are associated with Client A 320, while VS2 311 and VS4 314 are associated with Client B 321. Based on the predefined rules of resource allocation in the computing environment depicted in FIG. 3, Client A is not entitled to any share of the resources allocated to Client B without resource adjustment (i.e. Client A is "independent" of Client B).

In the computing environment depicted in FIG. 3, based on the predefined rules of resource allocation in the computing environment, each virtual server may use three units of resource without the need for resource adjustment (i.e. each virtual server is "entitled to" three units of resource). In particular, VS1 310 is entitled to resources A 330, B 331, C 332; VS2 311 is entitled to resources D 333, E 334, and F 335; VS3 313 is entitled to resource G 336, H 337, and I 338; and VS4 314 is entitled to resources J 339, K 340, L 341. Some of those resources, such as resource A 330, are currently unavailable (as indicated by the resource being represented as a circle), while other resources, such as resource F 335, are currently available (as indicated by the resource being represented as a pentagon). The resources (i.e. computing resources) may include one or more computing resources of different kinds, such as one or more execution resources (such as one or more processors, including one or more computer processors), storage resources (such as one or more of memory, hard disk, and/or other persistent storage resources), networking resources, and any other resources used in whole or in part to perform, facilitate, and/or enhance computing powers and/or computer functions and capabilities.

In the computing environment depicted in FIG. 3, VS1 310, which belongs to Client A 320 and resides on the primary computing platform 312, has no available resources, as resources A 330, B 331, and C 332 are all currently unavailable. VS2 311, which also resides on the primary computing platform 312, has the available resource F 335, but belongs to Client B 321. VS3 313, which also belongs to Client A 320, has the available resource I 338, but resides on the secondary computing platform 315. VS4 314, which has the available resource L 341, both belongs to Client B 321 and resides on the secondary computing platform 315, and as such does not share either client association or computing platform with VS1 310.

In the computing environment depicted in FIG. 3, if VS1 310 requires additional resources (e.g. to accomplish its performance objectives), the available resources from VS2 311 cannot be transferred to VS1 310 without affecting the share of resources to which independent Client B 321 is entitled. In addition, the available resources from VS3 313 cannot be transferred to VS1 310 without engaging in potentially costly inter-platform migration. Transferring available resources from VS4 314 to VS1 310 both affects the share of resources to which Client B 321 is entitled and involves potentially costly inter-platform migration.

At least in some embodiments, the virtual resource transfer program shifts resources from one or more donating virtual servers (e.g. VS2 311) associated with one or more donating clients (e.g. Client B 321) to a receiving virtual server (e.g. VS1 310) associated with one or more receiving clients (e.g. Client A 320), where the donating virtual servers and the receiving virtual servers reside on the same computing platform (i.e. are "neighbors"). In at least some of those embodiments, the program compensates the one or more donating clients through one or more resource transfers leading to the direct or indirect transfer of resources from the receiving clients to the donating clients (e.g. one or more resource transfers from VS3 313 to VS4 314).

Figure 4:
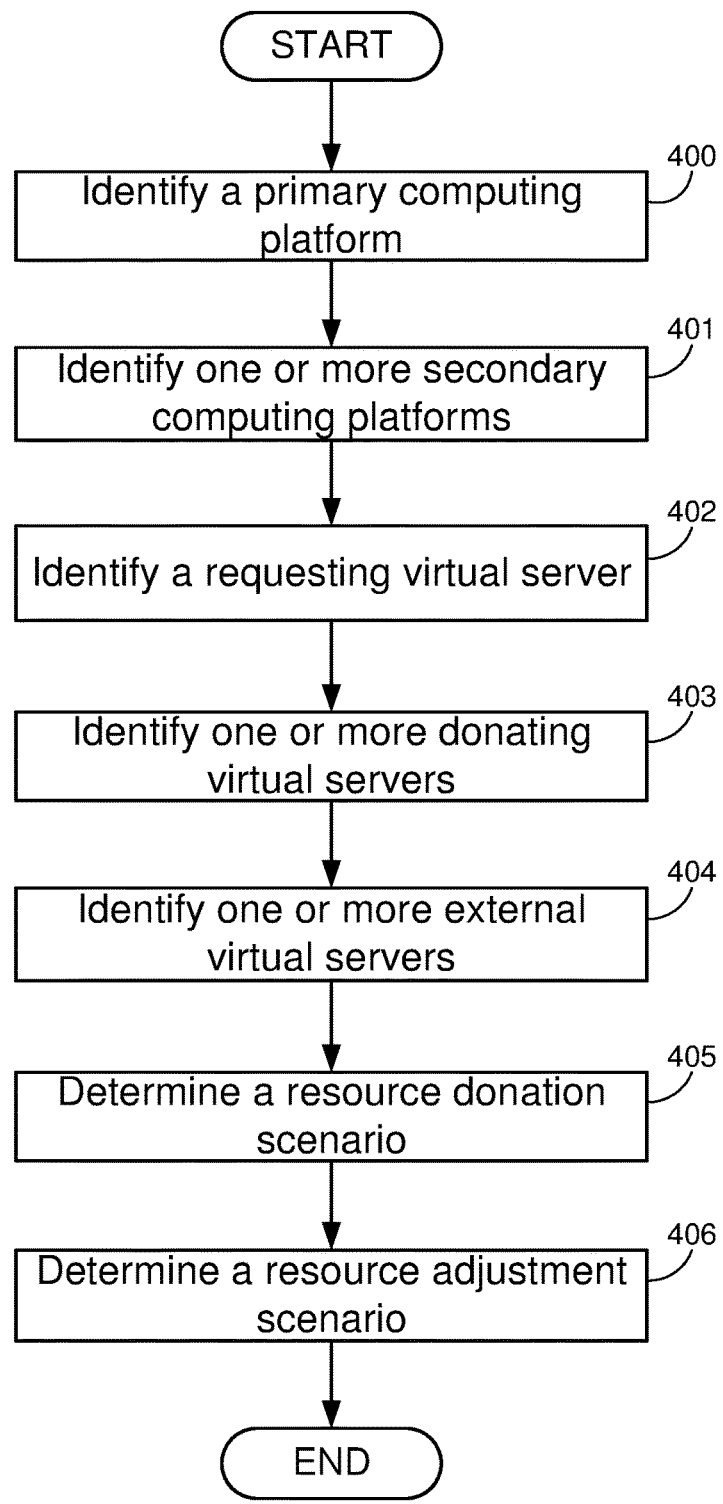
FIG. 4 is a flow-chart diagram of a virtual resource transfer program, in accordance with at least one embodiment of the present invention.

FIG. 4 is a flow-chart diagram for a virtual resource transfer program. At step 400, the program identifies a primary computing platform. At step 401, the program identifies one or more secondary computing platforms. At step 402, the program identifies a requesting virtual server residing on the primary computing platform, where the requesting virtual server is associated with one or more requesting clients. At step 403, the program identifies one or more donating virtual servers residing on the primary computing platform, where the one or more donating virtual servers are associated with one or more donating clients. At step 404, the program identifiers one or more external virtual servers residing on the one or more secondary computing platforms. At step 405, the program determines a resource donation scenario comprising one or more resource exchanges between the requesting virtual server and the one or more donating virtual servers. At step 406, the program determines a resource adjustment scenario comprising one or more resource exchanges between the one or more external virtual servers.

Figure 5A:
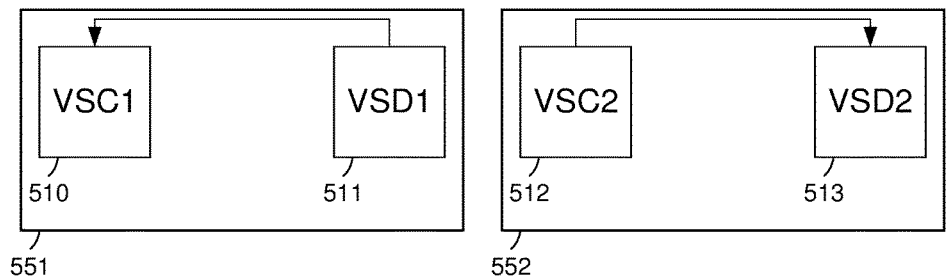
FIGS. 5A, 5B, and 5C depict operational examples of a virtual resource transfer program, in accordance with at least one embodiment of the present invention.
Figure 5B:
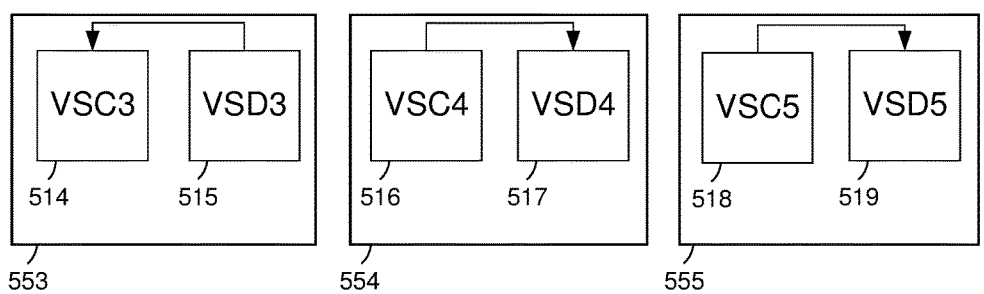
Figure 5C:
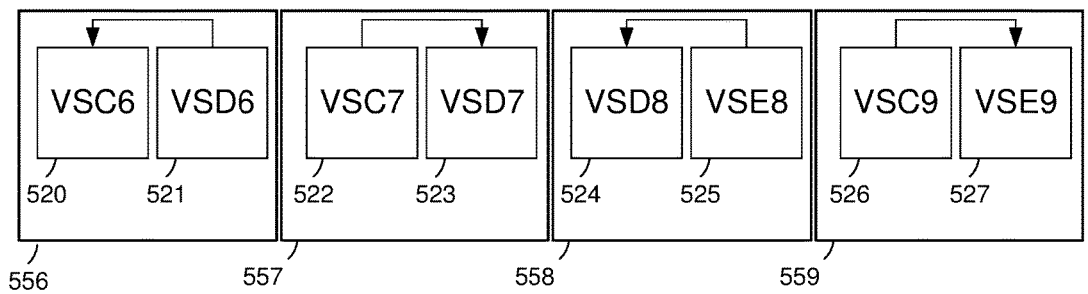

FIGS. 5A, 5B, and 5C are operational examples of a virtual resource transform program. In the embodiments depicted in FIGS. 5A, 5B, and 5C, the name of a virtual server is in the form VS [alphabetical letter] [integer number], where the alphabetical letter identifies the client with which a virtual server is associated, and the integer number identifies the computing platform on which the virtual server resides. For instance, virtual server VSC1 510 belongs to Client C and resides on computing platform CP1 551.

In the embodiment depicted in FIG. 5A, in accordance with a resource donation scenario, the virtual resource transfer program transfers resources from VSD1 511 to VSC1 510 in primary computing platform CP1 551. In accordance with a resource adjustment scenario, the program transfers resources from VSC2 512 to VSD2 513 on secondary computing platform CP2 552.

In the embodiment depicted in FIG. 5B, in accordance with a resource donation scenario, the virtual resource transfer program transfers resources from VSD3 515 to VSC3 514 on primary computing platform CP3 553. In accordance with a resource adjustment scenario, the program transfers resources from VSC4 516 to VSD4 517 on secondary computing platform CP4 554, and from VSC5 518 to VSD5 519 on secondary computing platform CP5 555.

In the embodiment depicted in FIG. 5C, in accordance with a resource donation scenario, the virtual resource transfer program transfers resources from VSD6 521 to VSC6 520 in primary computing platform CP6 556. In accordance with a resource adjustment scenario, the program transfers resources from VSC7 552 to VSD7 523 on secondary computing platform CP7 557, from VSE8 525 (belonging to intermediary Client E) to VSD8 524 on secondary computing platform CP8 558, and from VSC9 526 to VSE9 527 (belonging to Client E) on secondary computing platform CP9 559.

In the embodiment depicted in FIG. 5A, only two clients (i.e. the receiving Client C and the donating Client D) are involved in the resource donation transfers caused by the program (i.e. "the resource donation scenario"). Similarly, only those two clients are involved in the resource adjustment transfers caused by the program (i.e. "resource adjustment scenario"). As such, both the resource donation scenario on CP1 551 and the resource adjustment scenario on CP2 552 could be said to have a "client degree" of 2. Similarly, the overall resource exchange scenario as whole (comprising both the resource donation scenario and the resource adjustment scenario) has a client degree of 2. In the embodiment depicted in FIG. 5B, the resource donation scenario, the resource adjustment scenario, and the overall resource exchange scenario have a client degree of 2. In the embodiment depicted in FIG. 5C, the resource donation scenario has a client degree of 2, but the resource adjustment scenario and the overall resource exchange scenario have a client degree of 3, because of the participation of intermediary Client E.

In general, different embodiments of the present invention may have an arbitrary client degree associated with resource donation scenarios, resource adjustment scenarios and/or overall resource exchange scenarios. In some embodiments, the virtual resource transfer program limits the allowable client degree associated with resource donation scenarios, resource adjustment scenarios, and/or overall resource exchange scenarios by one or more constant values (e.g. a maximum allowable client degree of 5 associated with resource donation scenarios, a maximum allowable client degree of 4 associated with resource adjustment scenarios, and a maximum allowable client degree of 5 associated with overall resource exchanges scenarios), or by one or more variables dependent on one or more factors (e.g. one or more of time, system statistics, client level of privilege, etc.). In at least some embodiments, the client degree associated with an overall resource exchange scenario is the larger of the client degree associated with a resource donation scenario and the client degree associated with a resource adjustment scenario, where the overall resource exchange scenario comprises the resource donation scenario and the resource adjustment scenario.

In the embodiment depicted in FIG. 5A, the resource donation scenario occurs on one computing platform (i.e. CP1 551). The resource adjustment scenario also occurs on one computing platform (i.e. CP2 552). As such, both the resource donation scenario and the resource adjustment scenario could be said to have a "platform degree" of 1. The overall resource adjustment scenario occurs on two computing platforms (i.e. CP1 551 and CP2 552), and thus has a platform degree of 2. In the embodiment depicted in FIG. 5B, the resource donation scenario has a platform degree of 1, but the resource adjustment scenario has a platform degree of 2, and the overall resource exchange scenario has a platform degree of 3. In the embodiment depicted in FIG. 5C, the resource donation scenario has a platform degree 1, but the resource adjustment scenario has a platform degree of 3, and the overall resource exchange scenario has a platform degree of 4.

In at least some embodiments, a resource donation scenario always has a platform degree of 1. In general, different embodiments of the present invention may have an arbitrary platform degree associated with resource adjustment scenarios and/or overall resource exchange scenarios. In some embodiments, the virtual resource transfer program transfers limits the allowable platform degree associated with resource donation scenarios, resource adjustment scenarios, and/or overall resource exchange scenarios by one or more constant values (e.g. a maximum allowable platform degree of 1 associated with resource donation scenarios, a maximum allowable platform degree of 4 associated with resource adjustment scenarios, and a maximum allowable platform degree of 5 associated with overall resource exchanges scenarios), or by one or more variables dependent on one or more factors (e.g. one or more of time, system statistics, client level of privilege, etc.). In at least some embodiments, the platform degree associated with an overall resource adjustment scenario is the sum of the platform degree associated with a resource donation scenario and the platform degree associated with a resource adjustment scenario, where the overall resource exchange scenario comprises the resource donation scenario and the resource adjustment scenario.

In the embodiment depicted in FIG. 5A, the only resource transfer in the resource donation scenario (i.e. from donating Client D to receiving Client C) is direct (i.e. without any intermediate clients participating in the resource transfer chain between a donating client and the receiving client). Similarly, the only transfer in the resource adjustment scenario (i.e. from receiving Client C to donating Client D) is direct. As such, both the resource donation scenario and the resource adjustment scenario could be said to have a "depth" of 1. In general, the depth of a resource transfer scenario comprising one or more resource transfers is the largest number of resource transfers that lead to a direct or indirect transfer of resources between a donating client and the receiving client. As such, in the embodiment depicted in FIG. 5A, the overall resource exchange scenario also has a depth of 1.

In the embodiment depicted in FIG. 5B, all of three transfers between the donating Client D and the receiving Client C are direct and without intermediary clients. The resource donation scenario comprises a resource transfer between VSD3 515 and VSC3 514 that is a direct transfer of resources between donating Client D and receiving Client C, and thus has a depth of 1. The resource adjustment scenario comprises the resource transfer between VSC4 516 and VSD4 517 and the resource transfer between VSC5 518 and VSD5 519, both of which are direct resource transfers between receiving Client C and donating Client D, and as such have a depth of 1. The overall resource exchange scenario comprises the aforementioned three direct resource transfers, and as such has a depth of 1.

In the embodiment depicted in FIG. 5C, the resource donation scenario comprises a direct resource exchange between donating Client D and receiving Client C (i.e. the resource transfer between VSD6 521 and VSC6 520), and as such has a depth of 1. The resource adjustment scenario also comprises a direct resource exchange between receiving Client C and donating Client D (i.e. the resource transfer between VSC7 522 and VSD7 523), but also has an indirect resource exchange between Client C and Client D comprising two resource transfers (i.e. the resource transfer between VSE8 525 and VSD8 524 and the resource transfer between VSC9 526 and VSE9 527). As such, the resource adjustment scenario has a depth of 2. The overall resource exchange scenario has a depth of 2 as well.

In general, different embodiments of the present invention may have an arbitrary depth associated with resource donation scenarios, resource adjustment scenarios, and/or overall resource exchange scenarios. In some embodiments, the virtual resource transfer program transfers limits the allowable depth associated with resource donation scenarios, resource adjustment scenarios, and/or overall resource exchange scenarios by one or more constant values (e.g. a maximum depth of 3 for resource donation scenarios, a maximum depth of 5 for resource adjustment scenarios, and a maximum depth of 5 for overall resource exchange scenarios), or by one or more variables dependent on one or more factors (e.g. one or more of time, system statistics, client level of privilege, etc.). In at least some embodiments, the depth of an overall resource adjustment scenario is the larger of the depth of a resource donation scenario and the depth of a resource adjustment scenario, where the overall resource exchange scenario comprises the resource donation scenario and the resource adjustment scenario. In some embodiments, the resource adjustment scenario, the resource donation scenario, and/or the overall resource exchange must have a depth of 1.

The virtual resource transfer program identifies a primary computing platform at step 400 and identifies one or more secondary computing platforms at step 401. A computing platform is any platform that comprises (and/or allows access to) one or more computing resources as defined above (including one or more computer processing resources and/or one or more computer storage resources). In some embodiments, a computing platform comprises one or more elements selected from a group consisting of one or more computer hardware components, one or more public clouds, one or more private clouds, and one or more data centers. In at least some embodiments, one or more virtual resources reside on a computing platform. In at least some of those embodiments, the one or more virtual resources residing on a computing platform are able to transfer computing resources to each other through one or more mechanisms (such as inter-hardware resource migration). In at least some embodiments, one or more virtual resources reside on a computing platform when they are primarily associated with and/or primarily linked to that computing platform, or when they are able to transfer computing resources to other virtual servers on the computing platform through one or more mechanisms (such as inter-hardware resource migration).

In some embodiments, the virtual resource transfer program identifies a primary computing platform and one or more secondary computing platforms by identifying the computing platforms on which a resource need condition with respect to one or more virtual servers is determined. In some of those embodiments, the program maintains a list comprising indications of one or more computing platforms supporting one or more virtual servers in need of additional resources and indications of one or more computing servers not supporting one or more virtual servers in need of additional resources, and uses that list to identify a primary computing platform and one or more secondary computing platforms. In some embodiments, the program identifies a primary computing platform and one or more secondary computing platforms using one or more pieces of information provided by one or more other (hardware or software) computer components.

The virtual resource transfer program identifies a requesting virtual server at step 402, one or more donating virtual servers at step 403, and one or more external virtual servers at step 404. In some embodiments, the program identifies a requesting virtual server by identifying one or more virtual servers residing on the primary computing platform with regard to which a resource need condition is determined. In some embodiments, the program identifies one or more donating virtual servers by identifying one or more virtual servers residing on the primary computing platform with regard to which an excess performance capacity and/or the ability to downgrade service quality under the predefined rules of service quality (e.g. contained in one or more service level agreements associated with one or more components of the computing environment in which the program is implemented, including one or more resources, one or more clients, one or more virtual servers, and/or one or more computing platforms) is determined. In some embodiment, the program identifies a requesting virtual server, one or more donating virtual servers, and one or more external virtual servers using one or more pieces of information provided by one or more other (hardware or software) computer components.

The virtual resource transfer program determines a resource donation scenario at step 405 and determines a resource adjustment scenario at step 406. In some embodiments, the program determines a resource donation scenario and/or a resource adjustment scenario based on one or more pieces of information provided by one or more other (hardware or software) computer components. In some embodiments, the program determines a resource donation scenario and/or a resource adjustment scenario based on the performance history of one or more computing platforms, one or more virtual servers, and/or one or more resources. In some embodiments, the program stores indications of one or more resource transfers in the resource donation scenario and/or the resource adjustment scenario in one or more data structures in one or more computer readable storage media. The possible forms of computer readable storage media comprise persistent storage components (such as the hard disks), main memory components, cache components, registers and other storage media components in the processing circuit, online storage components, and offline bulk storage components.

In some embodiments, determining a resource need condition comprises determining, for each of the one or more donating virtual servers, a donation amount, where the donation amount of a donating virtual server is the amount of resources that the virtual server donates to a requesting virtual server as a result of a resource donation scenario. In some embodiments, the virtual resource transfer program determines a donation amount for one donating virtual server equal to the amount of the resource deficit determined with respect to a requesting virtual server. In some embodiments, the program determines one or more donation amounts for one or more donating virtual servers that when summed together produce a value equal to the amount of the resource deficit determined with respect to a requesting virtual server. In some embodiments, the program allows the sum of the donation amounts for one or more donating virtual servers to be unequal to the amount of the resource deficit determined with respect to a requesting virtual server. In some of those embodiments, the program limits by a pre-defined amount (e.g. 2 units of resources) the amount of the allowable difference between the sum of the donation amounts for one or more donating virtual servers and the amount of the resource deficit determined with respect to a requesting virtual server. In some embodiments, the virtual resource transfer program determines a donation amount for each of the one or more donating virtual servers based on one or more pieces of information provided by one or more other (hardware or software) computer components.

In some embodiments, the virtual resource transfer program determines a donation amount for each of the one or more donating virtual servers based on the determination of one or more performance properties of one or more virtual servers (including the requesting virtual server, the one or more donating virtual servers, and/or the one or more external virtual servers), for instance using one or more of the performance detection methods introduced below (including one or more static performance detection methods, one or more dynamic performance detection methods, the latter category including one or more goal-oriented performance detection methods).

In some embodiments, the virtual resource transfer program determines a resource donation scenario by estimating, measuring, and/or determining one or more performance properties and/or performance effects of one or more potential resource exchanges between a requesting virtual server and one or more donating virtual servers using one or more performance detection methods, for instance using one or more of the performance detection methods introduced below (including one or more static performance detection methods, one or more dynamic performance detection methods, the latter category including one or more goal-oriented performance detection methods).

In some embodiments, determining a resource adjustment scenario comprises determining, for each of the one or more donating clients, an adjustment amount, where the adjustment amount associated with a donating client is the amount of resources that the one or more virtual servers associated with the donating client receive directly or indirectly from the one or more virtual servers associated with the one or more receiving clients as a result of a resource adjustment scenario. In at least some of those embodiments, the virtual resource transfer program determines an adjustment amount associated with each of the one or more donating clients using one or more performance detection methods, for instance using one or more of the performance detection methods introduced below (including one or more static performance detection methods, one or more dynamic performance detection methods, the latter category including one or more goal-oriented performance detection methods).

In some embodiments, the virtual resource transfer program determines a resource adjustment scenario by estimating, measuring, and/or determining one or more performance properties and/or performance effects of one or more potential resource exchanges between one or more external virtual servers using one or more performance detection methods, for instance using one or more of the performance detection methods introduced below (including one or more static performance detection methods, one or more dynamic performance detection methods, the latter category including one or more goal-oriented performance detection methods).

In some embodiments, the virtual resource transfer program determines a resource need condition. In some embodiments, a resource need condition is any condition in which the program, with a pre-defined level of certainty (e.g. 75 percent certainty), determines that at least one virtual server in the computing environment in which the program is implemented needs additional resources to meet pre-defined performance objectives (e.g. defined in one or more service level agreements) and/or needs additional resources to perform its computing objectives within a pre-defined amount of time (e.g. successfully execute 1000 execution units in 2 minutes).

In some embodiments, the virtual resource transfer program determines a resource need condition using static performance detection methods that rely on pre-defined rules to determine one or more performance properties of one or more virtual servers. In some of those embodiments, the program determines a resource need condition when a virtual server is not entitled to a pre-defined number of resource units (e.g. a particular virtual server is not entitled to required 3 units of a particular resource). In other embodiments using static performance detection methods, the program determines a resource need condition when a virtual server is not entitled a pre-defined share of the computing platform resources (e.g. a particular virtual server is not entitled to 50 percent of the resources of the computing platform on which it resides). In some embodiments, the program determines a resource need condition when a virtual server is not entitled to a required amount and/or share of resources determined based on pre-defined, static properties associated with the virtual server (e.g. a particular virtual server is not entitled to 20 percent of the resources of the computing platform on which it resides for each client with which it is associated).

In some embodiments, the virtual resource transfer program determines a resource need condition using dynamic performance detection methods that rely on one or more execution properties and/or one or more performance details associated with one or more virtual servers, one or more resources, and/or one or more computing platforms to determine the performance properties of one or more virtual servers. In some of those embodiments, the program determines a resource need condition when a virtual server is not entitled to a required amount and/or share of resources determined based on one or more execution properties and/or one or more performance details associated with the virtual server (e.g. when a particular virtual server is not entitled to one percent of the resources of the computing platform on which it resides for each unit of network connection it is conducting). In some embodiments using dynamic performance detection methods, the program determines a resource need condition when a virtual server is not entitled to a required amount and/or share of resources determined based on the performance history of one or more virtual resources (e.g. when a particular virtual server has shown it needs 40 percent of the current existing resources on the computing platform on which it resides to reach the required speed of 100,000 floating point operations per second, as determined based on its performance history, and is not currently entitled to a 40 percent share of the current existing resources).

In some embodiments using dynamic performance detection methods, the virtual resource transfer program determines a resource need condition when a virtual server is not entitled to a required level (i.e. share and/or amount) of resources determined based on one or more goal-oriented performance detection methods, such as the approach used in IBM® Workload Manager for z/OS® (z/OS® WLM) or other existing goal-oriented performance detection methods known in the art today, such as the response time analysis and the pattern searching approaches introduced below. In some of those embodiments using dynamic performance detection methods, the program determines a resource need condition when a virtual server is not entitled to a level of resources determined based on the response time of the virtual server to one or more instructions (including one or more machine-level instructions) and/or one or more requested operations. In other embodiments using dynamic performance detection methods, the program determines a resource need condition when a virtual server is not entitled to a level of resources determined based on a pattern searching approach, such as the approach adopted by the IBM® Enterprise Workload Manager™ (EWLM) or other pattern searching approaches available in the art. In some embodiments, the program determines a resource need condition when a virtual server is not entitled to a level of resources determined based on the average, median, and/or mean of the one or more performance properties of one or more processors.

In some embodiments, the virtual resource transfer program determines a resource need condition based on one or more pieces of information provided by one or more other (hardware or software) computer components. In some embodiments, the program determines a resource need condition based on factors in addition to the performance properties of one or more virtual servers. In some embodiments, the program determines a resource need condition using a combination of the approaches mentioned above, including one or more performance detection methods of various types such as the methods mentioned above (including one or more static performance detection methods, one or more dynamic performance detection methods, the latter category including one or more goal-oriented performance detection methods).

In some embodiments, the virtual resource transfer program determines a resource need condition by identifying a current resource access amount, where the current resource access amount is the amount of resources that the requesting virtual server is entitled to (i.e. may use without need for resource adjustment); identifying one or more performance goals associated with the requesting virtual server; and estimating an optimal resource access amount, where the optimal resource access amount is the amount of resources that, to satisfy the one or more performance goals, the requesting virtual server needs to be entitled to. In at least some of those embodiments, the program determines a resource need condition if the current resource access amount is lower than the optimal resource access amount. In some embodiments, the program determines the current resource access amount and/or the optimal resource access amount using one or more performance detection methods, for instance using one or more of the performance detection methods introduced below (including one or more static performance detection methods, one or more dynamic performance detection methods, the latter category including one or more goal-oriented performance detection methods). In some embodiments, the program determines one or more performance goals associated with the requesting virtual server based on the predefined rules of service quality (for instance contained in one or more service level agreements associated with one or more components of the computing environment in which the virtual resource transfer program is implemented).

In some embodiments, determining the resource need condition comprises determining whether any of the one or more receiving clients does not meet its one or more entitlements under one or more service level agreements. In at least some of those embodiments, the virtual resource transfer program ensures that each virtual server meets all of its entitlements under one or more service level agreements at all times during regular, non-exceptional operations of the computing environment in which the program is implemented. In at least some embodiments, a service level agreement is any combination of one or more rules and/or one or more guidelines that defines, mandates and/or recommends performance objectives and/or performance requirements associated with one or more virtual servers, one or more clients, and/or one or more computing platforms, where the aforementioned performance objectives and/or performance requirements must be met during all regular, non-exceptional operations of the computing environment in which the virtual resource transfer program is implemented, and/or where the performance objectives and/or performance requirements may only be compromised under zero or more pre-defined conditions (e.g. in the event of a resource overflow).

In some embodiments, the virtual resource transfer program determines one or more resource adjustment criteria. In some embodiments, a resource adjustment criterion is a condition that must be estimated to hold, with a pre-defined level of certainty (e.g. 90 percent certainty), as a result of all regular, non-exceptional executions of an acceptable resource adjustment scenario, and/or where the condition may only be compromised under zero or more pre-defined conditions (e.g. in the event of a resource overflow).

In some embodiments, the virtual resource transfer program determines one or more resource adjustment criteria based on the determination of one or more performance properties of one or more virtual servers (including the requesting virtual server, the one or more donating virtual servers, and/or the one or more external virtual servers), for instance using one or more of the performance detection methods introduced above (including one or more static performance detection methods, one or more dynamic performance detection methods, the latter category including one or more goal-oriented performance detection methods). In an exemplary embodiment, the program detects one or more performance properties of a donating virtual server before and after the execution of a resource donation scenario using the response time of the virtual server to one or more instructions (including one or more machine-level instructions) and/or to one or more requested operations before and after an execution of the resource donation scenario. The program determines an increase in the response time and determines and/or estimates that, to restore the response time of the virtual server to pre-donation levels, an amount of resources equal to a specific amount is required. The program sets a resource adjustment criterion that a total amount of resources equal to the specific amount should be transferred to one or more virtual servers associated with the donating client (i.e. the client associated with the donating virtual server).

In some embodiments, determining the one or more resource adjustment criteria includes determining, for each of the one or more donating clients, a primary resource transfer value based on one or more operational properties of the primary computing platform; and determining, for each the one or more donating clients, one or more secondary resource transfer values, where the one or more secondary resource transfer values are operationally equivalent to the primary resource transfer value. In at least some embodiments, a resource transfer value is an indication of the amount of resources to be transferred from a set of one or more virtual servers to another set of one or more virtual servers in one or more computing platforms based on a particular resource exchange or a particular set of resource exchanges. In at least some embodiments, two resource transfer values are operationally equivalent if they represent the same amount of computing power and/or performance capability. In an exemplary embodiment, 2.5 units of resources on computing platform $CP_i$ is equivalent to 3 units of resources on computing platform $CP_j$ if it takes $CP_j$ 3 units of resources to accomplish the computing power and/or performance capability obtained by $CP_i$ using 2.5 units of resources. In some embodiments, the one or more resource adjustment criteria comprise a criterion that the computing power and/or performance capability of all of the one or more donating clients must be restored to pre-donation levels as a result of the resource adjustment scenario. In some embodiments, determining the primary resource transfer value comprises estimating the primary resource transfer value with a pre-defined level of certainty (e.g. 95 percent certainty). In some embodiments, determining the secondary resource transfer value comprises estimating that value with a pre-defined level of certainty.

In at least some embodiments, the virtual resource transfer program uses one or more performance properties of one or more computing platforms to determine operational equivalence between two resource transfer values. In at least some of those embodiments, the program determines one or more performance properties of one or more computing platforms using one or more performance detection values, for instance using one or more of the performance detection methods introduced above (including one or more static performance detection methods, one or more dynamic performance detection methods, the latter category including one or more goal-oriented performance detection methods).

Determining operational equivalence between resource transfer values can be accomplished using methods of estimating resource requirements of virtualized applications and/or estimating other virtualization overheads known in the art, such as approaches relying on profiling different categories of virtualization overheads using micro-benches and using regression models for mapping inter-platform usage profiles. In some embodiments, the program determines operational equivalence between resource transfer values based on one or more pieces of information provided by one or more other (hardware or software) computer components.

In some embodiments, the virtual resource transfer program includes determining, for each of the one or more donating clients, a total donation amount under the resource donation scenario; and determining, for each of the one or more donating clients, a total adjustment amount under the resource adjustment scenario. The total donation amount for a donating client under a resource donation scenario is the total amount of (i.e. the sum of) direct or indirect resource transfers from one or more virtual servers associated with the donating client to the receiving virtual server under the resource donation scenario. The total resource adjustment amount for a donating client under a resource adjustment scenario is the total amount of direct or indirect resource transfers from one or more virtual servers associated with the one or more receiving clients to one or more virtual servers associated with the donating client under the resource adjustment scenario. In some embodiments, the one or more resource adjustment criteria comprise a resource adjustment criterion that, for each of the one or more donating clients, the total donation amount must equal the total adjustment amount. In at least some of those embodiments, a resource adjustment scenario is only acceptable if each of the one or more donating clients receives one or more resource transfers equal to its donation amount through the one or more virtual servers associated with the donating client.

In some embodiments, the one or more resource adjustment criteria comprise a resource adjustment criterion that, for each of the one or more donating clients, the total donation amount may be unequal to the total adjustment amount. In some of those embodiments, the one or more resource adjustment criteria comprise a resource adjustment criterion that, for each of the one or more donating clients, the amount of difference between the total donation amount and the total adjustment amount cannot be more than a pre-defined amount (e.g. 2 units of resources).

In some embodiments, the one or more resource adjustment criteria comprise a resource adjustment criterion that a resource adjustment scenario must only comprise direct resource transfers between one or more virtual servers associated with the one or more donating clients and one or more virtual servers associated with the one or more receiving clients. In at least some of those embodiments, a resource adjustment scenario may only have a depth of 1. In some embodiments, the one or more external virtual servers are associated with the one or more requesting clients. In some embodiments, the virtual resource transfer program determines one or more resource adjustment criteria based on one or more pieces of information provided by one or more other (hardware or software) computer components.

In some embodiments, the one or more resource adjustment criteria comprise a resource adjustment criterion that each of the one or more donating clients must at all times meet its one or more entitlements under one or more service level agreements. In at least some of those embodiments, the virtual resource transfer program ensures that each donating virtual server meets all of its entitlements under one or more service level agreements at all times during regular, non-exceptional operations of the computing environment in which the program operates. In some embodiments, the program periodically monitors and/or detects one or more performance properties of one or more virtual servers to ensure the resource adjustment criterion that each of the one or more donating clients must at all times meet its one or more entitlements under one or more service level agreements.

In some embodiments, the virtual resource transfer program determines whether the execution of the resource adjustment scenario satisfies the one or more research adjustment criteria. In some embodiments, the program determines whether the execution of a resource adjustment scenario satisfies one or more research adjustment criteria based on one or more pieces of information provided by one or more other (hardware or software) computer components. In some embodiments, the program stores indications of whether the resource adjustment scenario satisfies the one or more research adjustment criteria, for instance in one or more data structures in one or more computer readable storage media. In some embodiments, the program determines whether the execution of a resource adjustment scenario satisfies the one or more research adjustment criteria by running a simulation and/or a complete execution of the resource adjustment scenario on one or more computing platforms (e.g. in a computing environment other than the computing environment in which the virtual resource transfer program is implemented).

In some embodiments, the virtual resource transfer program determines whether the execution of a resource adjustment scenario satisfies one or more research adjustment criteria by estimating, measuring, and/or determining one or more performance properties and/or performance effects of the resource adjustment scenario using one or more performance detection methods, for instance using one or more of the performance detection methods introduced above (including one or more static performance detection methods, one or more dynamic performance detection methods, the latter category including one or more goal-oriented performance detection methods).

In some embodiments, the virtual resource transfer program periodically monitors the performance properties and/or performance effects of the resource adjustment scenario using one or more performance detection methods to ensure the resource adjustment criterion that each of the one or more donating clients must at all time meet its one or more entitlements under one or more service level agreements. In some embodiments, the program determines whether the execution of resource adjustment scenario satisfies the one or more research adjustment criteria based on the performance history of one or more computing platforms, one or more virtual servers, and/or one or more resources.

In some embodiments, determining a resource adjustment scenario is performed responsive to the one or more requesting clients being independent from the one or more donating clients. In at least some embodiments, one or more requesting clients are independent from one or more donating clients if the one or more requesting clients are not entitled to share the resources of the one or more donating clients without resource adjustment. In some embodiments, the virtual resource transfer program determines whether one or more requesting clients are independent from one or more donating clients based on one or more resource exclusivity guidelines. In an exemplary embodiment, the program determines a set of requesting clients are independent from a set of donating clients if (based on an example set of resource exclusivity guidelines) the two sets share less than three identical members.

In some embodiments, the one or more requesting clients are not independent from the one or more donating clients if the one or more donating clients comprise the one or more requesting clients. In an exemplary embodiment, the program determines that two requesting clients C1 and C2 are not independent from three donating clients C3, C4, and C5 if at least one of C3, C4, and C5 is identical to C1 and at least one of C3, C4, and C5 is identical to C2. In some embodiments, the program determines whether one or more requesting clients are independent from one or more donating clients based on one or more pieces of information provided by one or more other (hardware or software) computer components.

In some embodiments, the virtual resource transfer program executes the resource donation scenario and/or the resource adjustment scenario. In some embodiments, the program generates one or more instructions (including one or more machine-level instructions) to execute the resource donation scenario and/or the resource adjustment scenario. In some embodiments, the program receives pre-generated and/or pre-compiled code for executing a resource donation scenario and/or a resource adjustment scenario obtained directly or indirectly from one or more computer (hardware or software) components. In some embodiments, the program executes the resource donation scenario and/or resource adjustment scenario based on one or more pieces of information provided by one or more other (hardware or software) computer components, such as one or more instructions (including one or more machine-level instructions) generated by one or more other (hardware or software) computer components. In at least some embodiments, the program executes the resource donation scenario and/or the resource adjustment scenario on one or more computer execution resources, such as one or more external execution resources residing outside the primary computer platform and/or outside the one or more secondary computing platforms.

In some embodiments, the virtual resource transfer program executes the resource donation scenario and/or the resource adjustment scenario responsive to the resource adjustment scenario satisfying the one or more research adjustment criteria. In some embodiments, the program retrieves the indications of whether the resource adjustment scenario satisfies the one or more research adjustment criteria from one or more data structures in one or more computer readable storage media.

In some embodiments, the present invention may be implemented to perform inter-platform management of resources (including inter-platform transfer of resources and intra-platform shifting of resources between virtual servers associated with two or more clients) between computing platforms of the same and/or different types, including in environments where some but not all of the computing platforms are of the same type. In an exemplary embodiment, the present invention may be implemented to perform inter-platform management of resources in an environment comprising five computing platforms $CP_i$, $CP_{ii}$, $CP_{iii}$, $CP_{iv}$, and $CP_v$, where $CP_i$ is of the type $T_1$, $CP_{ii}$ and $CP_{iii}$ are of the type $T_2$, and $CP_{iv}$ and $CP_v$ are of the type $T_3$, where $T_1$, $T_2$, and $T_3$ are three different computing platform types. In at least some embodiments, the virtual resource transfer program determines the operational equivalence between resource transfer values, using for instance the methods introduced above, to facilitate inter-platform resource management of resources in environments comprising computing platforms of two or more types.

In some embodiments, the present invention may be implemented using a centralized management unit (such as a service manager) which interacts with one or more computer (hardware or software) components in the computing environment in which the virtual resource transfer program is implemented (including one or more computing platforms, one or more virtual resources, one or more client agent software components, and/or one or more computing resources) to perform the virtual resource transfer program. In an exemplary embodiment, the centralized management unit identifies the primary computing platform, one or more secondary computing platforms, a requesting virtual server, one or more donating virtual servers, one or more external virtual servers, one or more receiving clients, and one or more donating clients through communications with one or more components in the computing environment in which the virtual resource transfer program is implemented. Relying on one or more pieces of information obtained from communications with the one or more components in the computing environment in which the virtual resource transfer program is implemented, the centralized management unit determines a resource donation scenario and a resource adjustment scenario.

In other embodiments, the present invention may be implemented without a centralized management unit, for instance using communications between one or more distributed management units residing on and/or being associated with one or more (hardware or software) components present in the computing environment in which the present invention is implemented (including one or more computing platforms, one or more virtual resources, one or more client agent software components, and/or one or more computing resources).

In an exemplary embodiment, a distributed management unit on a virtual server determines a resource need condition with regard to its own performance and sends an indication denoting the virtual server's status as a requesting virtual server (i.e. a "requesting indication") to other virtual servers on the same computer platform (i.e. the primary computing platform). The requesting indication contains the amount of resources that the requesting virtual server needs and the client with which the requesting virtual server is associated. One or more distributed management units on one or more virtual servers on the primary computing platform receive the aforementioned requesting indication, determine their respective virtual servers' excess performance capacity and/or the ability to downgrade service quality under the predefined rules of service quality, and send an indication denoting their respective virtual servers' status as a donating virtual server (i.e. a "donating indication") to the requesting virtual server. The donating indication from each donating virtual server contains the amount of resources that the donating virtual server can donate and the client with which the donating virtual server is associated. Each distributed management unit on the primary computing platform determines a resource donation scenario and broadcasts an indication of that scenario to all other distributed management units on the primary computing platform. Each distributed management unit compares the received resource donation scenario indications and chooses the scenario that has been received from the most number of distributed management units. One distributed management unit on the primary computing platforms broadcasts the chosen resource donation scenario to one or more distributed management units on one or more secondary computing platforms.

In the exemplary embodiment using communications between one or more distributed management units introduced above, distributed management units on each secondary computing platform broadcast indications denoting their client association and excess performance capacity and/or the ability to downgrade service quality under the predefined rules of service quality to other distributed management units on the same secondary computing platform. Each distributed management unit on a secondary computing platform determines a resource adjustment scenario and broadcasts an indication of that scenario to other distributed management units on the same secondary computing platform. Each distributed management unit on the secondary computing platform compares the received resource adjustment scenario indications and chooses the scenario that has been received from the most number of distributed management units. One distributed management unit on each secondary computing platform transmits the chosen resource adjustment scenario to all the distributed management units on the primary computing platform.

In the exemplary embodiment using communications between one or more distributed management units introduced above, each distributed management unit on the primary computing platform determines a resource adjustment unit and broadcasts an indication of that scenario to other distributed management units on the same primary computing platform. Each distributed management unit on the primary computing platform compares the received resource adjustment scenario indications and chooses the scenario that has been received from the most number of distributed management units. One distributed management unit on the primary computing platform transmits the chosen resource adjustment scenario to all the distributed management units on all the external virtual servers.

Communications between some or all computer (hardware or software) components participating in an implementation of the present invention and/or present in the computing environment in which the present invention is implemented (including one or more management units, one or more computing platforms, one or more virtual resources, one or more client agent software components, and/or one or more computing resources) may be performed using one or both of agent- and agent-less communication methods, such as the Simple Network Management Protocol (SNMP) protocol, the Server Management Block (SMB) protocol, etc.

Aspects of the present invention allow for transfer of resources between virtual servers associated with a client but residing on two or more computing platforms without incurring the costs of inter-platform migration, and in a manner that allows for adjusting resources to ensure that the resource access level of one or more donating clients is not compromised in an unexpected and/or unauthorized manner (e.g. based on the predefined rules of service quality for instance contained in one or more service level agreements associated with one or more components of the computing environment in which the virtual resource transfer program is implemented) as a result of the transfer. Nevertheless, the aforementioned advantages are not required to be present in all of the embodiments of the invention and may not be present in all of the embodiments of the invention.

Figure 6:
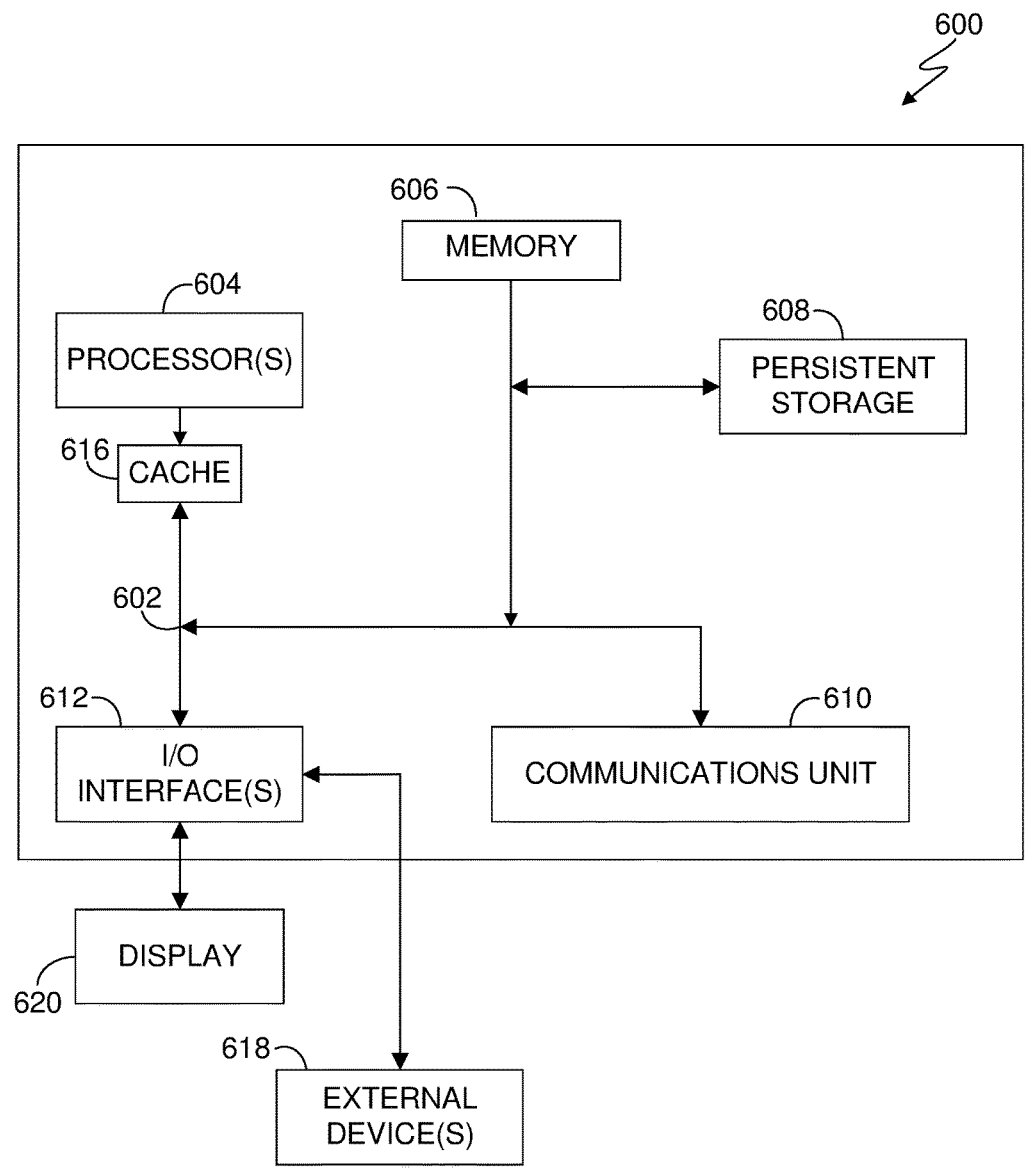
FIG. 6 is a block diagram of a computing apparatus suitable for executing a virtual resource transfer program, in accordance with at least one embodiment of the present invention.

FIG. 6 is a block diagram depicting components of a computer 600 suitable for executing the virtual resource transfer program. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g. microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the virtual resource transfer program may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The virtual resource transfer program may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a primary computing platform;
identifying one or more secondary computing platforms;
identifying a requesting virtual server, said requesting virtual server residing on said primary computing platform and being associated with one or more requesting clients;
identifying one or more donating virtual servers, said one or more donating virtual servers residing on said primary computing platform and being associated with one or more donating clients;
identifying one or more external virtual servers, said one or more external virtual servers residing on said one or more secondary computing platforms;
determining a resource donation scenario, said resource donation scenario comprising one or more resource exchanges between said requesting virtual server and said one or more donating virtual servers;
determining a resource adjustment scenario, said resource adjustment scenario comprising one or more resource exchanges between said one or more external virtual servers; and
determining a resource need condition;
determining one or more resource adjustment criteria; and
determining whether execution of said resource adjustment scenario satisfies said one or more resource adjustment criteria; and
wherein determining said one or more resource adjustment criteria comprises:
determining, for each of said one or more donating clients, a primary resource transfer value based on one or more operational properties of said primary computing platform; and
determining, for each of said one or more donating clients, one or more secondary resource transfer values, said one or more secondary resource transfer values being operationally equivalent to said primary resource transfer value.

2. A computer program product, comprising:
one or more computer readable storage media and program instructions stored on said one or more computer readable storage media, said program instructions comprising instructions to:
identify a primary computing platform;
identify one or more secondary computing platforms;
identify a requesting virtual server, said requesting virtual server residing on said primary computing platform and being associated with one or more requesting clients;
identify one or more donating virtual servers, said one or more donating virtual servers residing on said primary computing platform and being associated with one or more donating clients;
identify one or more external virtual servers, said one or more external virtual servers residing on said one or more secondary computing platforms;
determine a resource donation scenario, said resource donation scenario comprising one or more resource exchanges between said requesting virtual server and said one or more donating servers;
determine a resource adjustment scenario, said resource adjustment scenario comprising one or more resource exchanges between said one or more external virtual servers;
determine a resource need condition;
determine one or more resource adjustment criteria; and
determine whether execution of said resource adjustment scenario satisfies said one or more resource adjustment criteria; and
wherein said instructions to determine said one or more resource adjustment criteria comprise instructions to:
determine, for each of said one or more donating clients, a primary resource transfer value based on one or more operational properties of said primary computing platform; and
determine, for each of said one or more donating clients, one or more secondary resource transfer values, said one or more secondary resource transfer values being operationally equivalent to said primary resource transfer value.

3. A computer system comprising:
a processor;
one or more computer readable storage media;
computer program instructions;
said computer program instructions being stored on said one or more computer readable storage media; and
said computer program instructions comprising instructions to:
identify a primary computing platform;
identify one or more secondary computing platforms;
identify a requesting virtual server, said requesting virtual server residing on said primary computing platform and being associated with one or more requesting clients;
identify one or more donating virtual servers, said one or more donating virtual servers residing on said primary computing platform and being associated with one or more donating clients;
identify one or more external virtual servers, said one or more external virtual servers residing on said one or more secondary computing platforms;
determine a resource donation scenario, said resource donation scenario comprising one or more resource exchanges between said requesting virtual server and said one or more donating servers; and
determine a resource adjustment scenario, said resource adjustment scenario comprising one or more resource exchanges between said one or more external virtual servers;
determine a resource need condition;
determine one or more resource adjustment criteria; and
determine whether execution of said resource adjustment scenario satisfies said one or more resource adjustment criteria; and
wherein said instructions to determine said one or more resource adjustment criteria comprise instructions to:
determine, for each of said one or more donating clients, a primary resource transfer value based on one or more operational properties of said primary computing platform; and
determine, for each of said one or more donating clients, one or more secondary resource transfer values, said one or more secondary resource transfer values being operationally equivalent to said primary resource transfer value.

* * * * *